US008539496B1

(12) United States Patent
Anand et al.

(10) Patent No.: US 8,539,496 B1
(45) Date of Patent: Sep. 17, 2013

(54) METHOD AND APPARATUS FOR CONFIGURING NETWORK SYSTEMS IMPLEMENTING DIVERSE PLATFORMS TO PERFORM BUSINESS TASKS

(75) Inventors: Rajan Anand, Edison, NJ (US); Pari Bajpay, Edison, NJ (US); Jackson Liu, Middletown, NJ (US); Prafulla Verma, Holmdel, NJ (US); Rahul Anand, Edison, NJ (US); Clayton Lockhart, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1417 days.

(21) Appl. No.: 11/301,710

(22) Filed: Dec. 12, 2005

(51) Int. Cl.
*G06F 9/46* (2006.01)
*G06F 15/173* (2006.01)

(52) U.S. Cl.
USPC ........... 718/104; 718/100; 718/102; 718/106; 709/223; 709/224; 709/226

(58) Field of Classification Search
USPC .............. 717/117; 707/10; 705/1; 709/226, 709/238; 718/104, 102
See application file for complete search history.

(56) References Cited

U.S. PATENT DOCUMENTS

| | | | | |
|---|---|---|---|---|
| 5,845,116 A * | 12/1998 | Saito et al. | ..................... | 718/103 |
| 6,128,315 A * | 10/2000 | Takeuchi | ...................... | 370/466 |
| 6,496,863 B1 * | 12/2002 | Palmer | ......................... | 709/224 |
| 6,950,802 B1 * | 9/2005 | Barnes et al. | ..................... | 705/7 |
| 6,959,268 B1 * | 10/2005 | Myers Jr. et al. | ................. | 703/6 |
| 6,978,422 B1 * | 12/2005 | Bushe et al. | .................. | 715/734 |
| 7,072,934 B2 * | 7/2006 | Helgeson et al. | ............. | 709/203 |
| 7,293,059 B2 * | 11/2007 | Pearson | ........................ | 709/201 |
| 7,428,592 B2 * | 9/2008 | Lee et al. | ....................... | 709/226 |
| 7,430,513 B2 * | 9/2008 | Kirkland et al. | ............... | 705/1.1 |
| 7,441,241 B2 * | 10/2008 | Dawson et al. | ............... | 718/102 |
| 7,668,939 B2 * | 2/2010 | Encarnacion et al. | ........ | 709/220 |
| 7,672,854 B2 * | 3/2010 | Kirkland et al. | .............. | 705/342 |
| 7,827,563 B2 * | 11/2010 | Westervelt et al. | ........... | 719/315 |
| 2001/0027453 A1 * | 10/2001 | Suto | ................................ | 707/10 |
| 2001/0047279 A1 * | 11/2001 | Gargone | ........................... | 705/1 |
| 2002/0143816 A1 * | 10/2002 | Geiger et al. | ................ | 707/513 |
| 2002/0156866 A1 * | 10/2002 | Schneider | ..................... | 709/218 |
| 2002/0156932 A1 * | 10/2002 | Schneiderman | .............. | 709/317 |
| 2003/0028856 A1 * | 2/2003 | Apuzzo et al. | ................ | 717/124 |
| 2003/0046282 A1 * | 3/2003 | Carlson et al. | .................... | 707/6 |
| 2004/0103373 A1 * | 5/2004 | Wei | ................................ | 715/513 |
| 2004/0193388 A1 * | 9/2004 | Outhred et al. | ................... | 703/1 |
| 2004/0199572 A1 * | 10/2004 | Hunt et al. | ..................... | 709/201 |
| 2005/0010924 A1 * | 1/2005 | Hipp et al. | ..................... | 718/104 |
| 2005/0135384 A1 * | 6/2005 | Hipp et al. | ..................... | 370/397 |
| 2005/0198647 A1 * | 9/2005 | Hipp et al. | ..................... | 719/310 |
| 2006/0047669 A1 * | 3/2006 | Durrence et al. | .............. | 707/10 |
| 2006/0048157 A1 * | 3/2006 | Dawson et al. | ............... | 718/104 |
| 2006/0075407 A1 * | 4/2006 | Powers et al. | ................. | 718/100 |
| 2006/0106585 A1 * | 5/2006 | Brown et al. | ..................... | 703/1 |
| 2006/0107266 A1 * | 5/2006 | Martin et al. | ................. | 718/100 |

(Continued)

*Primary Examiner* — Emerson Puente
*Assistant Examiner* — Charles Swift (57) ABSTRACT

Method and apparatus for configuring systems implementing diverse platforms in a network is described. In one example, functional units of the systems are exposed to define abstract function signatures. A template is specified using at least one of the abstract function signatures to define at least one executable task. The template is translated into configuration data adapted to configure each of the system to collectively perform the at least one executable task. The configuration data is applied to the systems through a coupler layer adapted to interface with each of the diverse platforms.

17 Claims, 5 Drawing Sheets

(56) References Cited

U.S. PATENT DOCUMENTS

| | | | |
|---|---|---|---|
| 2006/0129601 A1* | 6/2006 | Chang et al. | 707/104.1 |
| 2006/0149842 A1* | 7/2006 | Dawson et al. | 709/226 |
| 2006/0168584 A1* | 7/2006 | Dawson et al. | 718/104 |
| 2006/0206789 A1* | 9/2006 | Bakman et al. | 715/500 |
| 2006/0253849 A1* | 11/2006 | Avram et al. | 717/172 |
| 2006/0265689 A1* | 11/2006 | Kuznetsov et al. | 717/117 |
| 2007/0078960 A1* | 4/2007 | Dawson et al. | 709/223 |
| 2007/0106773 A1* | 5/2007 | Gallino et al. | 709/223 |
| 2007/0130127 A1* | 6/2007 | Passmore et al. | 707/3 |
| 2007/0198317 A1* | 8/2007 | Harthcryde et al. | 705/8 |
| 2008/0028405 A1* | 1/2008 | Martin et al. | 718/102 |
| 2008/0215358 A1* | 9/2008 | Goldszmidt et al. | 705/1 |
| 2009/0049448 A1* | 2/2009 | Dawson et al. | 718/104 |
| 2009/0157796 A1* | 6/2009 | McMahon et al. | 709/202 |

\* cited by examiner

METHOD AND APPARATUS FOR CONFIGURING NETWORK SYSTEMS IMPLEMENTING DIVERSE PLATFORMS TO PERFORM BUSINESS TASKS

BACKGROUND OF THE INVENTION

1. Field of the Invention

Embodiments of the present invention generally relate to network systems and, more particularly, to a method and apparatus for configuring network systems implementing diverse platforms to perform business tasks.

2. Description of the Related Art

An enterprise business process involves multiple steps, usually operating in a variety of areas, involving a variety of systems. A system is a software application deployed on a computer or a set of computers working together to implement specific business functionality. For example, the functionality could be billing, ordering, provisioning, inventory, ticketing, sales, etc. Each of these systems typically provides an interface to interact with external systems or applications. Different systems are implemented using different technology and different platforms. Some business tasks require the interaction of systems having diverse platforms. Conventionally, a user wishing to perform such a business task must understand the details of each platform in order to properly configure each system. This requires the user to have knowledge and expertise for several different types of systems and platforms. Accordingly, there exists a need in the art for an improved method and apparatus for configuring network systems implementing diverse platforms to perform business tasks.

SUMMARY OF THE INVENTION

Method and apparatus for configuring systems implementing diverse platforms in a network is described. In one embodiment, functional units of the systems are exposed to define abstract function signatures. A template is specified using at least one of the abstract function signatures to define at least one executable task. The template is translated into configuration data adapted to configure each of the system to collectively perform the at least one executable task. The configuration data is applied to the systems through a coupler layer adapted to interface with each of the diverse platforms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
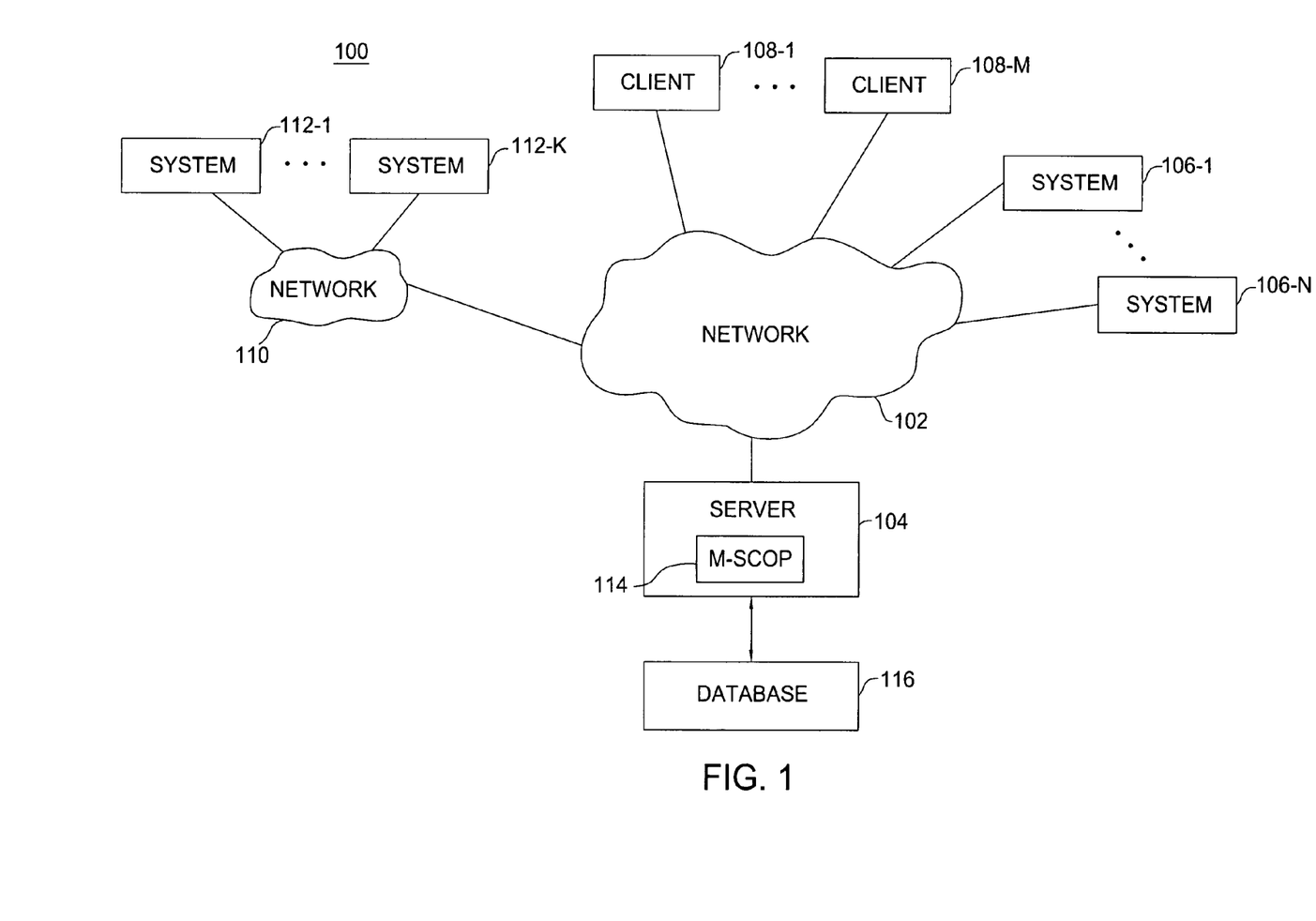
FIG. 1 is a block diagram depicting an exemplary embodiment of a network architecture in which the present invention may be employed.

FIG. 1 is a block diagram depicting an exemplary embodiment of a network architecture 100 in which the present invention may be employed. The network architecture 100 includes a network 102, a server 104, systems 106-1 through 106-N (collectively systems 106), clients 108-1 through 108-M (collectively clients 108), a network 110, and systems 112-1 through 112-K (collectively systems 112), where N, M, and K are integers greater than zero. The server 104, the systems 106, the clients 108, and the network 110 are coupled to the network 102. The systems 112 are coupled to the network 110. The systems 106 and the clients 108 are configured for communication with the server 104 through the network 102. The systems 112 are configured for communication with the server 104 through the network 110 and the network 102. The system 104 may be coupled to a database 116. The database 116 may comprise one or more storage devices associated with the server 104. Alternatively, the database 116 may be more sophisticated and include one or more servers implementing any type of well-known database platforms (e.g., Oracle).

Each of the systems 106 and 112 include a software application deployed on a computer or set of computers working together to implement a specific business functionality. For example, the systems 106 and 112 may implement billing, ordering, provisioning, inventory, ticketing, sales, and like type business functionalities known in the art. Each of the systems 106 and 112 provides an interface for interacting with external systems. Notably, the server 104 may communicate with each of the systems 106 and 112 through such interface. The systems 106 and 112 employ various diverse platforms written using different languages and having different types of interfaces.

The server 104 implements a multi-system configuration and optimization platform (M-SCOP) 114. The M-SCOP 114 is an intelligent, configurable system that allows independent software applications and systems to expose their functionality to the M-SCOP 114. Users may interact with the M-SCOP 114 to specify a template that combines various exposed functionalities into a combinable unit for accomplishing a business task. The users interact with the M-SCOP 114 through a front end implemented by the clients 108. Each of the clients 108 includes a computer, such as a desktop computer or workstation. Those skilled in the art will appreciate that the network architecture 100 is just one example of a network architecture in which the present invention may be employed. For example, the M-SCOP 114 may be implemented on a computer with which users directly interact, rather than in a client-server architecture. In general, the M-SCOP 114 may be employed to configure various systems implementing diverse platforms in a network.

Figure 2:
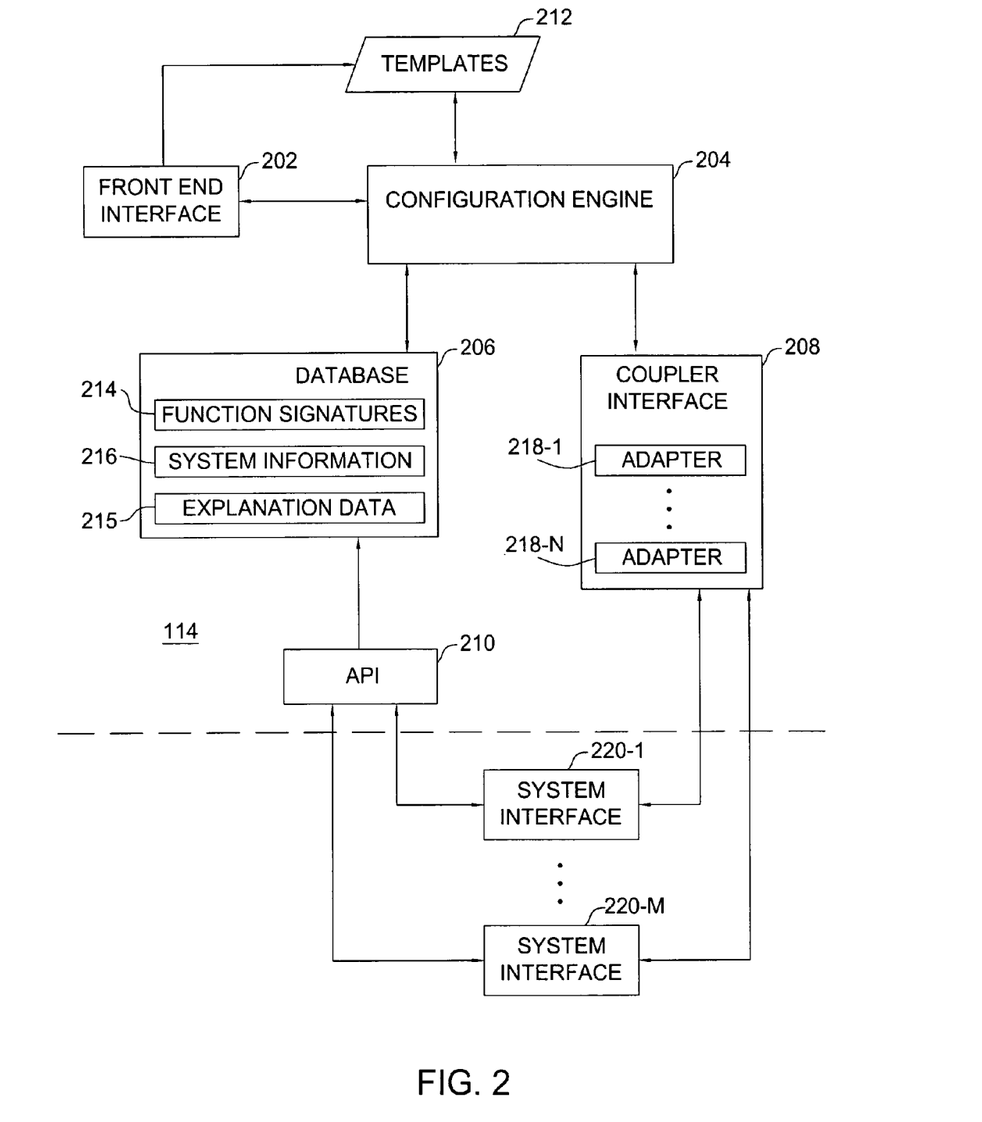
FIG. 2 is a block diagram depicting an exemplary embodiment of a multi-system configuration and optimization platform (M-SCOP) in accordance with one or more aspects of the invention.

FIG. 2 is a block diagram depicting an exemplary embodiment of the M-SCOP 114 in accordance with one or more aspects of the invention. The M-SCOP 114 includes a front end interface 202, a configuration engine 204, a database 206, a coupler interface 208, and an application programming interface (API) 210. The M-SCOP 114 is shown in communication with system interfaces 220-1 through 220-M (collectively system interfaces 220), where M is an integer greater than zero. The system interfaces 220 are interfaces to various systems, such as the systems 106 and 112 shown in FIG. 1. The elements of the M-SCOP 114 shown in FIG. 2 are functional modules and do not imply a physical implementation. In one embodiment, the M-SCOP 114 comprises computer-readable program code that may be implemented on one or more computers, servers, network elements, and the like.

The API 210 provides a software interface through which an external system can register with the M-SCOP 114 and announce its functionality. The API 210 receives registration input from external systems via the system interfaces 220. For each system, the registration input comprises information associated with the system. In one embodiment, the registration input includes an identifier and parameter information for each functional unit being exposed. The registration input may include other types of data, such an address on which the system providing the registration input is being hosted. The parameter information may include a list of input parameters and types of such input parameters a functional unit accepts, and a list of output parameters and types of such output parameters the functional unit provides. The API 210 is configured to store the registration input in the database 206.

Notably, the database 206 stores abstract function signatures 214. The abstract function signatures 214 provide an abstract representation of exposed functional units of the systems. The abstract function signatures 214 hide the platform differences among the systems by representing the functional units in terms of functionality, input data, and output data. The database 206 may also store system information 216 associated with the systems, such as the addresses on which the systems are hosted. The database 206 may also store explanation data 215 for the exposed functional units. The explanation data may include detailed information regarding the functionalities of the exposed function units, as well as up-to-date knowledge of how the functional units may be combined to achieve specific business tasks.

The front end interface 202 may comprise a graphical user interface (GUI) or like type interface to the M-SCOP 114. For example, a user may access the M-SCOP 114 via a Web-enabled browser on the GUI. Through the front end interface 202, users may access the function signatures 214 and explanation data 215 stored in the database 208. The front end interface 202 enables specification of a template using one or more of the function signatures to define at least one executable task. The abstract function signatures enable the user to combine functional units of the systems into a single executable unit that hides the platform differences of the systems. Templates may be further specified using various conditional constructs along with the function signatures, such as if/then logic, basic Boolean expression evaluation, and the like. The templates may further include user-defined functions that are defined by one or more function signatures and conditional constructs. That is, function signatures and conditional logic may be bundled as a separate function, allowing programmable building blocks for faster definition of executable tasks. In this manner, the front end interface 202 provides template data 212.

The configuration engine 204 translates a specified template into configuration data. The configuration data is adapted to configure the systems associated with the functional units used in the template to collectively perform the executable task(s) defined by the template. The configuration engine 204 employs a pattern recognition process to process the template to produce the configuration data. In one embodiment, the pattern recognition process is a rule-based engine for converting the template into configuration data for the systems. For example, similar to compilation of program code, such as C, the rule-based engine may include a lexical analysis, a syntactical analysis, and a semantic analysis. Lexical analysis involves dividing the template into regular expressions for further processing. Syntactical analysis involves identifying structure of the template from the regular expressions. Semantic analysis involves recognizing the meaning of the template with respect to the functional units of the systems. The configuration data includes input data for each of the functional units of the systems involved in the task(s).

The coupler interface 208 is configured to apply the configuration data produced by the configuration engine 204 to particular systems involved in the requested task(s). The coupler interface 208 is coupled to each of the system interfaces 220. The coupler interface 208 includes adapters 218-1 through 218-N (collectively 218), where N is an integer greater than zero. The adapters 218 are configured to communicate with the diverse interfaces of the systems. That is, each of the adapters 218 provides an interface between the M-SCOP 214 and a particular platform implemented by one or more systems. The coupler interface 208 allows the platform/language differences among the system interfaces 220 to be hidden from the user. Exemplary adapters include simple socket interfaces to more sophisticated modules written in CORBA, J2EE, .NET, and like type languages.

Figure 3:
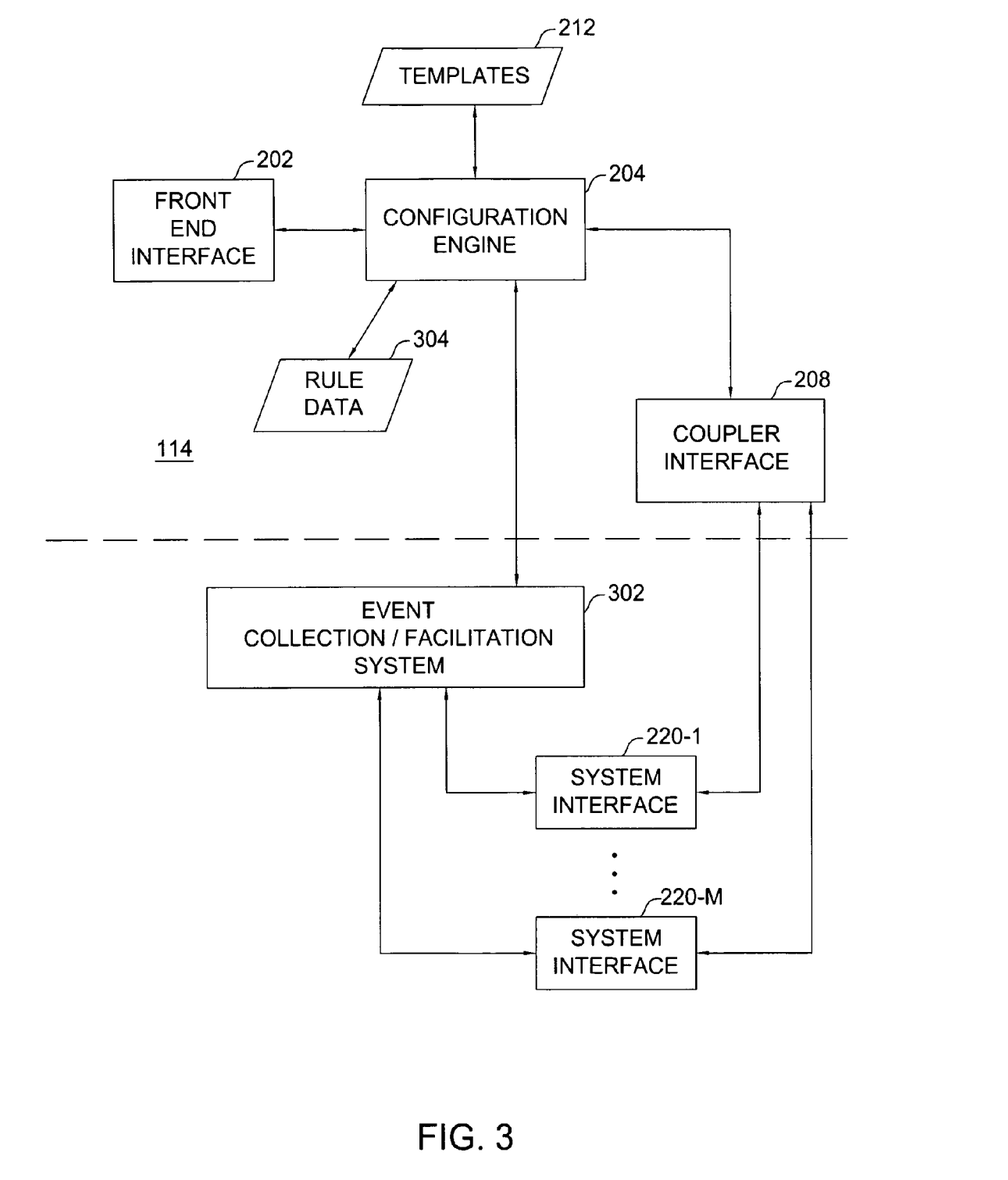
FIG. 3 is a block diagram depicting exemplary embodiment of the M-SCOP of FIG. 2 in communication with an event connection/facilitation system in accordance with one or more aspects of the invention.

FIG. 3 is a block diagram depicting exemplary embodiment of the M-SCOP 114 in communication with an event connection/facilitation system 302 in accordance with one or more aspects of the invention. Elements in FIG. 3 that are the same or similar to those of FIG. 2 are designated with identical reference numerals. In addition, some elements of the M-SCOP 114 are omitted for the sake of clarity in the present example. The event collection/facilitation system 302 is coupled to the configuration engine 204 and to each of the system interfaces 220. The event collection/facilitation system 302 may comprise a rule-based notification engine that subscribes to various events from the systems. The event collection/facilitation system 302 matches the events against one or more rules specified by the subscriptions to trigger notifications. An exemplary event collection/facilitation system is described in U.S. patent application Ser. No. 10/437,833, filed May 14, 2003, which is incorporated by reference herein.

In one embodiment, the event collection/facilitation system 302 is configured to send notifications of events to the configuration engine 204. The configuration engine 204 may display the notification to a user via the front end interface 202. In this manner, the user may identify a change in one or more systems and take appropriate action by specifying a template to perform a particular task. In one embodiment, the configuration engine 204 may process the notification data from the event collection/facilitation system 302 and, in accordance with rule data 304, automatically select one or more templates from the template data 212 to configure systems to perform particular task(s). Thus, the configuration engine 204 may cause the systems to perform particular business tasks automatically without human-intervention based on particular notifications received from the event collection/facilitation system 302.

Figure 4:
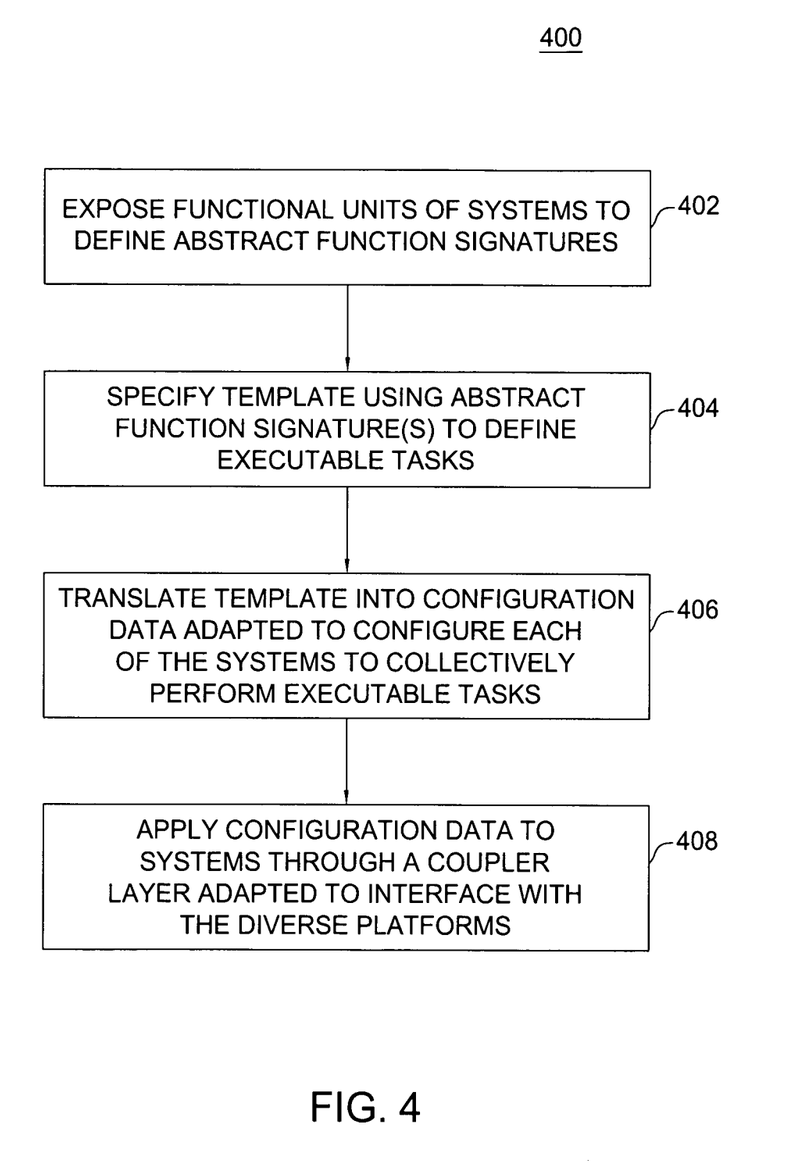
FIG. 4 is a flow diagram depicting an exemplary embodiment of a method for configuring systems implementing diverse platforms in a network in accordance with one or more aspects of the invention.

FIG. 4 is a flow diagram depicting an exemplary embodiment of a method 400 for configuring systems implementing diverse platforms in a network in accordance with one or more aspects of the invention. The method 400 begins at step 402, where functional units of the systems are exposed to define abstract function signatures. At step 404, a template is specified using at least one of the abstract function signatures to define at least one executable task. At step 406, the template is translated into configuration data adapted to configure each of the systems to collectively perform the executable task(s). The template may be translated in response to a user command or automatically base on various rules, such as in response to notifications from an event collection/facilitation system or in response to a periodic schedule. At step 408, the configuration data is applied to the systems through a coupler layer adapted to interface with each of the diverse platforms.

Figure 5:
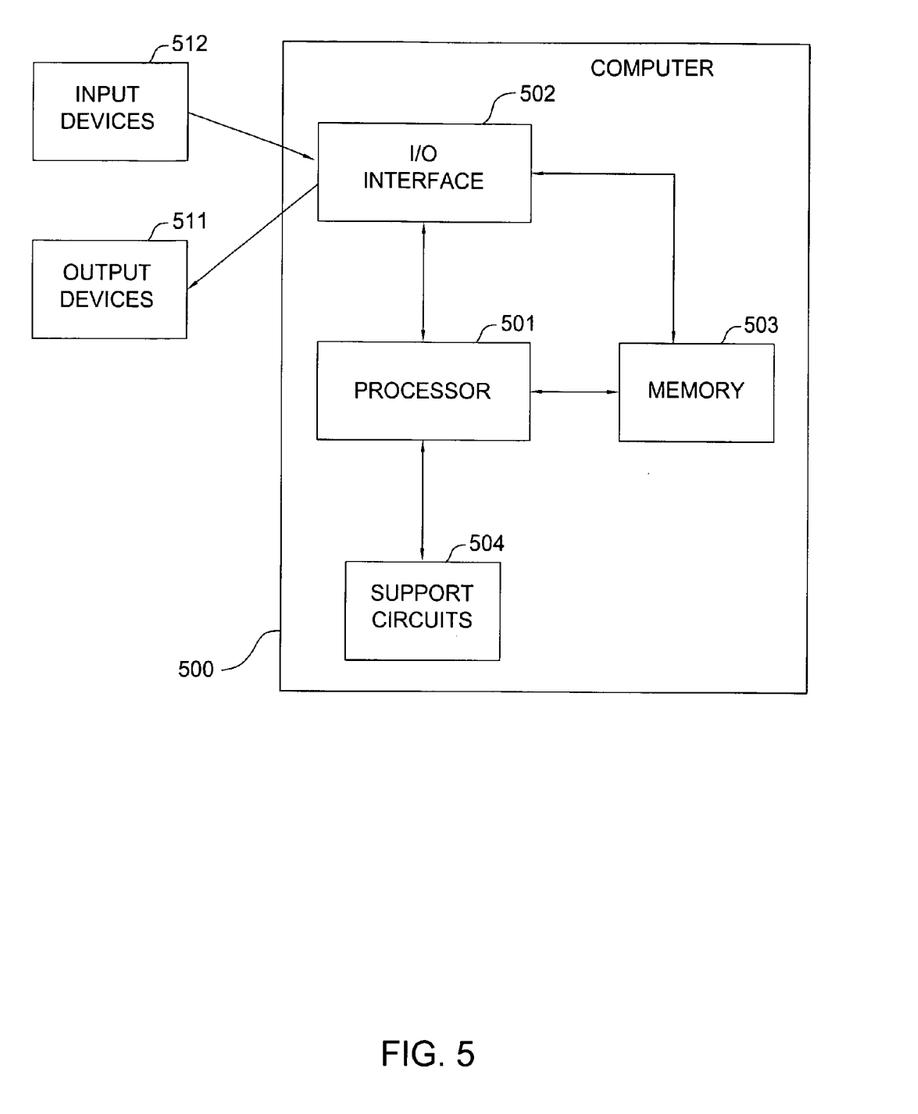
FIG. 5 is a block diagram depicting an exemplary embodiment of a computer configured to implement the processes and methods described herein.

FIG. 5 is a block diagram depicting an exemplary embodiment of a computer 500 configured to implement the processes and methods described herein. The computer 500 may be used to implement the M-SCOP 114 and perform the method 400. The computer 500 includes a processor 501, a memory 503, various support circuits 504, and an I/O interface 502. The processor 501 may be any type processing element known in the art, such as microprocessor. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 may be coupled to various input devices 512 and output devices 511, such as a conventional keyboard, mouse, printer, and the like.

The memory 503 may store all or portions of one or more programs and/or data to implement the processes and methods described herein. Notably, the memory 503 may store program code to be executed by the processor 501 for implementing the M-SCOP 114 and performing the method 400 of FIG. 4. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of configuring systems implementing diverse platforms in a network, comprising:

defining, by a processor, a plurality of abstract function signatures from functional units of the systems, wherein the systems have different types of interfaces, wherein each of the abstract function signatures is defined to represent a respective functional unit in terms of functionality, input data and output data that the respective functional unit accepts;

specifying, by the processor, a template comprising the plurality of abstract function signatures to define an executable task;

translating, by the processor, the template into configuration data adapted to configure each of the systems to collectively perform the executable task, wherein the translating comprises processing the template using a pattern recognizing engine to produce the configuration data; and applying, by the processor, the configuration data to the systems through a coupler layer adapted to interface with each of the diverse platforms.

2. The method of claim 1, wherein the defining the plurality of abstract function signatures comprises:

receiving an identifier for each of the functional units;

receiving parameter information for each of the functional units; and defining an abstract function signature for each of the functional units using the identifier and parameter information associated therewith.

3. The method of claim 1, further comprising:

associating each of the abstract function signatures with functionality information for the corresponding one of the functional units.

4. The method of claim 1, wherein the template is further specified using a conditional construct.

5. The method of claim 1, further comprising:

receiving a notification of an event generated by one of the systems;

wherein the template is specified in response to the notification.

6. The method of claim 1, further comprising:

receiving a notification of an event generated by one of the systems;

wherein the translating and the applying are automatically performed in response to the notification.

7. Apparatus for configuring systems implementing diverse platforms in a network, comprising:

a processor; and a computer-readable medium storing a plurality of instructions which, when executed by the processor, cause the processor to perform operations, the operations comprising:

defining a plurality of abstract function signatures from functional units of the systems, wherein the systems have different types of interfaces, wherein each of the abstract function signatures is defined to represent a respective functional unit in terms of functionality, input data and output data that the respective functional unit accepts;

specifying a template comprising the plurality of abstract function signatures to define an executable task;

translating the template into configuration data adapted to configure each of the systems to collectively perform the executable task, wherein the translating comprises processing the template using a pattern recognizing engine to produce the configuration data; and applying the configuration data to the systems through a coupler layer adapted to interface with each of the diverse platforms.

8. The apparatus of claim 7, wherein the defining comprises:

receiving an identifier for each of the functional units;

receiving parameter information for each of the functional units; and defining an abstract function signature for each of the functional units using the identifier and parameter information associated therewith.

9. The apparatus of claim 7, wherein the operations further comprise:

associating each of the abstract function signatures with functionality information for the corresponding one of the functional units.

10. The apparatus of claim 7, wherein the operations further comprise specifying the template using a conditional construct.

11. The apparatus of claim 7, wherein the operations further comprise:

receiving a notification of an event generated by one of the systems;

wherein the template is specified in response to the notification.

12. The apparatus of claim 7, wherein the translating further comprises:

receiving a notification of an event generated by one of the systems;

wherein the template is translated and the configuration data is applied in response to the notification.

13. A non-transitory computer readable storage medium storing instructions that, when executed by a processor, cause the processor to perform operations for configuring systems implementing diverse platforms in a network, the operations comprising:

defining a plurality of abstract function signatures from functional units of the systems, wherein the systems have different types of interfaces, wherein each of the abstract function signatures is defined to represent a respective functional unit in terms of functionality, input data and output data that the respective functional unit accepts;

specifying a template comprising the plurality of abstract function signatures to define an executable task;

translating the template into configuration data adapted to configure each of the systems to collectively perform the executable task, wherein the translating comprises processing the template using a pattern recognizing engine to produce the configuration data; and applying the configuration data to the systems through a coupler layer adapted to interface with each of the diverse platforms.

14. The non-transitory computer readable storage medium of claim 13, wherein the defining the plurality of abstract function signatures comprises:

receiving an identifier for each of the functional units;

receiving parameter information for each of the functional units; and defining an abstract function signature for each of the functional units using the identifier and parameter information associated therewith.

15. The non-transitory computer readable storage medium of claim 13, wherein the template is further specified using a conditional construct.

16. The non-transitory computer readable storage medium of claim 13, the operations further comprising:

receiving a notification of an event generated by one of the systems;

wherein the template is specified in response to the notification.

17. The non-transitory computer readable storage medium of claim 13, the operations further comprising:

receiving a notification of an event generated by one of the systems;

wherein the translating and the applying are automatically performed in response to the notification.

* * * * *